Patented Oct. 11, 1949

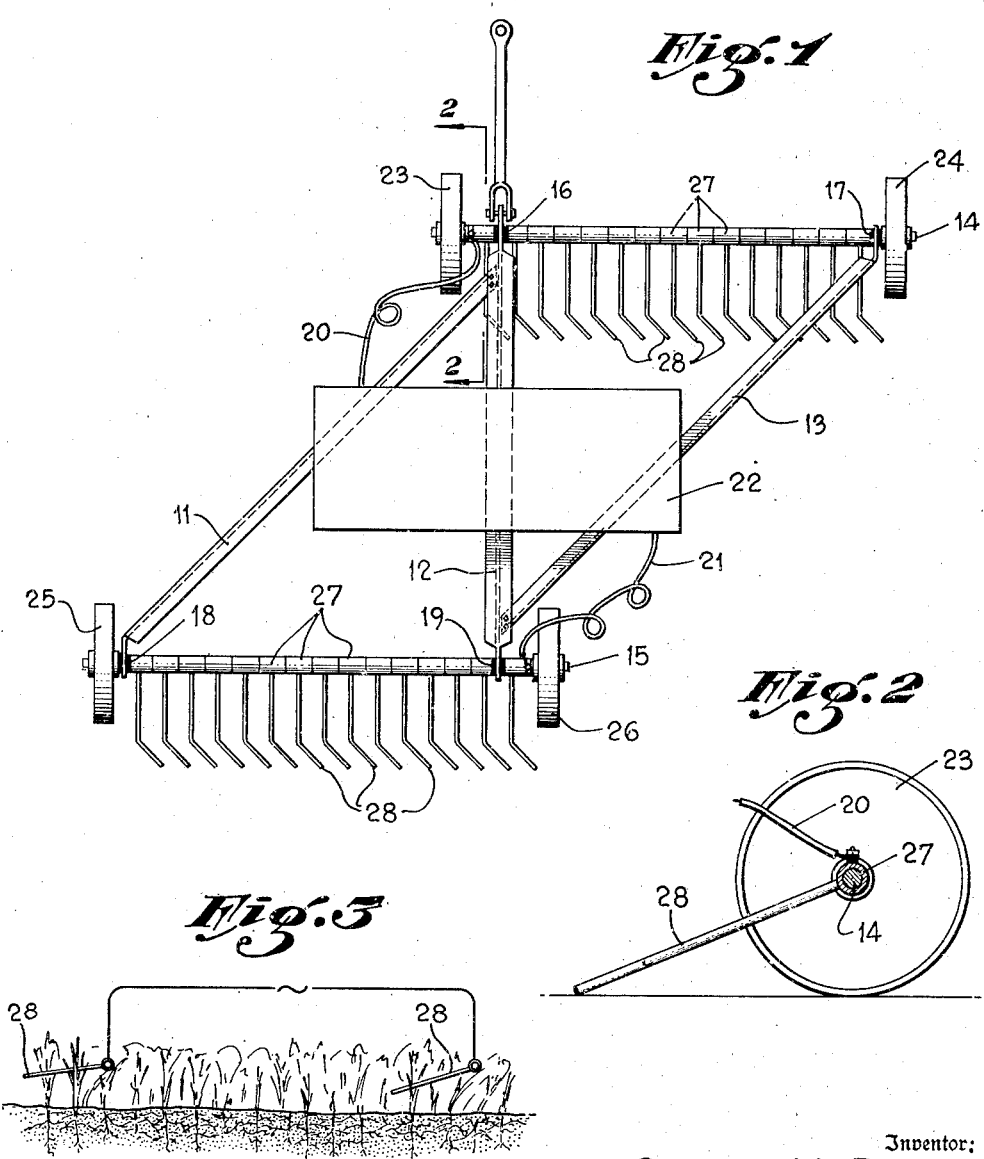

2,484,443

UNITED STATES PATENT OFFICE 2,484,443

ELECTRICAL WEED KILLER

Gilbert M. Baker, Los Angeles, Calif.

Application May 7, 1945, Serial No. 592,462

5 Claims. (Cl. 47—1.3)

This invention relates to improvements in electrical weed-killing apparatus and has for a main object the provision of means, carried by a suitable vehicle, for applying high voltage electricity between spaced areas of the exposed portions of the weeds; an electrical current thus flowing from one group of weeds to another through the roots therebetween.

For killing weeds electrically, it has been proposed in the prior art to employ as one electrode a metal stake buried in the ground (or the grounded iron rail of a railroad) and to arrange the other electrode to contact the upper portions of the weeds so that the current flows to the weeds through the ground. This prior-art method has been found to have certain disadvantages, aside from the inconvenience of moving the ground stakes as different areas are treated; one of the deficiencies of that method residing in the fact that, if the ground is relatively wet, there is a tendency for the current to burn the portions of the weeds above the ground while not affecting their roots—the weeds therefore remaining partially undestroyed. In distinction, by the method of the present invention the entire plant is destroyed since, in general, the only way the current can flow between different areas of the weeds is through their roots.

Other objects and advantages of the invention will be found in the description, the drawing, and the claims; and, for full understanding of the invention, reference is to be had to the following detailed description and accompanying drawing, wherein:

Figure 1 represents, more-or-less schematically in plan, a weed-killing device embodying the invention;

Figure 2 is an enlarged fragmentary section taken along the line 2—2 of Fig. 1; and Figure 3 is a diagram illustrating the path taken by the electricity.

The vehicle shown in Fig. 1 comprises a frame composed of the three members 11, 12, and 13 which are rigidly joined together and supported on a pair of wheeled axles 14 and 15; insulation being provided between the frame and the axles as indicated at 16, 17, 18, and 19. In practice, other insulating means may be employed, but for sake of clarity of the drawing simplified means are here shown. The axles 14 and 15 form a pair of electrodes to which the terminals 20 and 21 of a source of electrical energy, diagrammatically indicated at 22, are connected. The wheels 23, 24, 25, and 26, are preferably insulated from the electrodes, as by forming the portion of each wheel between its hub and its rim of insulating material. Mounted on the electrodes 14 and 15 is a plurality of metal sleeves 27, to each of which is secured a contact element or rod 28. As is seen in Fig. 2, the length of these elements is such that they trail on the ground as the vehicle is moved; the sleeves 27 being a relatively loose fit on the electrodes so that the contact elements can rise and fall to conform to uneven ground or weeds of different heights. The elements 28 are in good electrical contact with the respective electrodes 14 and 15 and form effectively extensions thereof; the outer end portions of the elements being bent so that adjacent elements overlap in the path of movement of the vehicle. As is seen in Fig. 1, the electrodes 14 and 15 are arranged in parallel relation to each other in a horizontal plane, the electrodes also being staggered so that the width of the path traversed by them is increased.

The source of electrical energy 22 is preferably a dynamo capable of generating alternating current which is stepped-up by means of a transformer so that the voltage applied to the electrodes is of the order of 12,500 volts. As is seen in the diagram of Fig. 3, the electrical circuit is from one terminal of the source, through the contact elements of one of the electrodes, through the upper portions of the weeds, and thence through the intertwined roots (and to some extent through the ground), and thence through the upper portions of the weeds in contact with the elements of the other electrode back to the source. It is thus seen that the conduction of electricity is mainly independent of the moisture in the ground since the intertwined roots (which are always relatively moist) can form the conducting path. The device of this invention generally functions better when the ground is relatively dry; however, with some types of weeds, the roots of which are closely joined, the presence of a relatively large amount of moisture in the ground is no hinderance.

It will be observed that the source of high voltage is connected to the pair of electrodes 14—15 at their respectively opposite ends. By this arrangement it has been found that the flow of electricity from one set of contact elements to the other (through the weeds) is relatively uniform in spite of possible poor-contact between some of the sleeves 27.

While it is preferred to provide contact elements yieldably mounted on the electrodes as illustrated, the electrodes may also take other forms, such as, for example, a pair of chains arranged in generally equally-spaced loops.

The embodiment of my invention herein shown and described is obviously susceptible of still further modification without departing from the spirit of the invention, and I intend therefore to be limited only by the scope of the appended claims.

I claim as my invention:

1. An electrical weed killer of the character described comprising, a platform formed for movement over the ground, a first set of material-contacting electrodes, including a plurality of contact members formed for rotation about an axis substantially parallel to the ground, each of said members extending substantially radially of said axis and having a portion thereof angularly bent from said radial extension whereby the portion of each of said members substantially overlies the radially extending portion of the adjacent member, a second set of material-contacting electrodes similar to said first set and spaced therefrom on said platform, a source of electrical potential provided on said platform, and a connection means from said source to the opposite ends of each of said sets whereby a circuit is established between said sets and the material upon which they are formed to operate.

2. An electrical weed exterminator of the character described comprising, a wheeled platform including side members and axle shafts at opposite ends of said side members, said axle shafts being offset substantially parallel one to the other, said axle shafts being insulated from said wheels and said side members, a plurality of material-contacting elements positioned on said axle shafts and formed for pivoting individually about said shafts, each of said members including a portion radially extending from said shafts and a second portion angularly bent from said first portion whereby upon movement of said platform over the material being operated upon said second portions will substantially describe overlapping areas of movement, a source of electrical potential on said platform, and connection means between said source and the opposite ends of each of said axle shafts.

3. An electrical weed exterminator of the character described comprising, a wheeled platform including side members and axle shafts at opposite ends of said side members, said axle shafts being offset substantially parallel one to the other, said axle shafts being insulated from said wheels and said side members, a plurality of material-contacting elements positioned on shafts extending substantially parallel to the ground and formed for pivoting individually about said shafts, each of said members including a portion radially extending from said shafts and a second portion angularly bent from said first portion whereby upon movement of said platform over the material being operated upon said second portions will substantially describe overlapping areas of movement, a source of electrical potential on said platform, and connection means between said source and each of said shafts whereby a circuit is effected from said source of potential through one of said shafts and the electrodes pivoted thereon to and through the material being operated upon to the other of said shafts through the electrodes pivoted thereon and returning by said means to said source.

4. An electrical weed killer comprising, a wheel supported vehicle adapted for movement over ground having vegetation to be removed, a plurality of vegetation-contacting electrodes carried by said vehicle for individual rotation about an axis substantially parallel to the ground, each of said electrodes extending substantially radially from said axis and having a portion thereof angularly bent from said radial extension whereby the portion of each of said electrodes substantially overlies the radially extending portion of the adjacent electrode, and a source of electrical potential connected to said electrodes to pass electrical current through the vegetation contacted by said electrodes.

5. An electric weed killer comprising, a plurality of rod-like electrodes, means freely pivotally supporting one end of each of said electrodes along a substantially horizontal axis substantially parallel to but spaced over the ground to be treated and for movement over the ground in a direction of movement substantially perpendicular to said axis whereby said electrodes are carried in substantially parallel side by side relation with their length parallel to the direction of movement, each of said electrodes extending radially from said axis and having a portion bent from said radial extension by a distance overlying in a longitudinal plane the bent portion of the adjacent electrode, and a source of electrical potential connected to said electrodes to pass electrical current through the vegetation contacted by said electrodes.

GILBERT M. BAKER.

REFERENCES CITED

The following references are of record in the file of this patent:

UNITED STATES PATENTS

| Number | Name | Date |
| --- | --- | --- |
| 546,682 | Scheible | Sept. 24, 1895 |
| 2,007,383 | Opp | July 9, 1935 |

FOREIGN PATENTS

| Number | Country | Date |
| --- | --- | --- |
| 158,090 | Great Britain | Jan. 28, 1921 |

OTHER REFERENCES

Sci. & Inv., vol. 15 (Nov. 1927), p. 610.
Farm Machinery & Equipment, 1st ed., 1929, by Smith, p. 94, Figs. 119 and 120a.